United States Patent
Kimura et al.

(10) Patent No.: US 9,277,102 B2
(45) Date of Patent: Mar. 1, 2016

(54) AUDIO PROCESSING APPARATUS, AUDIO PROCESSING METHOD AND IMAGING APPARATUS

(71) Applicant: CANON KABUSHIKI KAISHA, Tokyo (JP)

(72) Inventors: Masafumi Kimura, Kawasaki (JP); Fumihiro Kajimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 519 days.

(21) Appl. No.: 13/680,813

(22) Filed: Nov. 19, 2012

(65) Prior Publication Data
US 2013/0141599 A1  Jun. 6, 2013

(30) Foreign Application Priority Data
Dec. 1, 2011  (JP) ................. 2011-264110

(51) Int. Cl.
| | |
|---|---|
| H04R 3/02 | (2006.01) |
| G06F 17/00 | (2006.01) |
| H04N 5/225 | (2006.01) |
| G06F 3/16 | (2006.01) |
| H04N 5/232 | (2006.01) |

(Continued)

(52) U.S. Cl.
CPC .............. *H04N 5/225* (2013.01); *G01M 13/028* (2013.01); *G06F 3/16* (2013.01); *G10L 21/0208* (2013.01); *H04N 5/2328* (2013.01); *H04N 5/23258* (2013.01)

(58) Field of Classification Search
CPC ...... G10L 25/93; G11B 20/1057; H04R 3/12; H04R 27/00

USPC .......... 381/56, 58, 61, 71.1, 71.8–71.14, 73.1, 381/94.1–94.4, 94.7–94.9, 119; 700/94; 369/2–5; 348/231.3; 396/312; 704/226, 704/233
See application file for complete search history.

(56) References Cited

U.S. PATENT DOCUMENTS

| | | | |
|---|---|---|---|
| 7,596,231 B2 * | 9/2009 | Samadani | G10L 21/0208 381/94.1 |
| 8,681,999 B2 * | 3/2014 | Theverapperuma | 381/312 |

(Continued)

FOREIGN PATENT DOCUMENTS

| | | |
|---|---|---|
| JP | 03-295400 | 12/1991 |
| JP | 2007-060429 A | 3/2007 |

(Continued)

OTHER PUBLICATIONS

The above foreign patent documents were cited in the Aug. 31, 2015 Japanese Office Action, that issued in Japanese Patent Application No. 2011264110.

*Primary Examiner* — Vivian Chin
*Assistant Examiner* — William A Jerez Lora
(74) *Attorney, Agent, or Firm* — Cowan, Liebowitz & Latman, P.C.

(57) ABSTRACT

An audio processing apparatus including: an obtaining unit configured to obtain audio signals; and a processor configured to process the audio signals, wherein if it is not determined that the audio signals contain an abnormal value, the processor calculates a next sample value based on a predetermined number of sample values of the audio signals obtained by the obtaining unit, and wherein if it is determined that the audio signals contain an abnormal value, the processor uses the calculated next sample value so as to calculate a further next sample value.

15 Claims, 9 Drawing Sheets

(51) Int. Cl.
*G10L 21/0208* (2013.01)
*G01M 13/02* (2006.01)

(56) References Cited

U.S. PATENT DOCUMENTS

2006/0265218 A1* 11/2006 Samadani ........... G10L 21/0208
 704/233
2008/0130927 A1* 6/2008 Theverapperuma . H04R 25/453
 381/318
2008/0144852 A1* 6/2008 Rebandt ............. G10K 11/1788
 381/71.8
2011/0182438 A1* 7/2011 Koike .................... G10L 21/04
 381/73.1

FOREIGN PATENT DOCUMENTS

| | | |
|---|---|---|
| JP | 2008-053802 | 3/2008 |
| JP | 2011-002723 A | 1/2011 |
| JP | 2011-028061 A | 2/2011 |

* cited by examiner

AUDIO PROCESSING APPARATUS, AUDIO PROCESSING METHOD AND IMAGING APPARATUS

BACKGROUND OF THE INVENTION

1. Field of the Invention

The present invention relates to an audio processing apparatus, an audio processing method and an imaging apparatus.

2. Description of the Related Art

With the recent digitalization of imaging apparatuses such as cameras, various sensors are incorporated in imaging apparatuses. Examples of such sensors include a microphone for detecting audio, a shake detection sensor for detecting a shake, a focus detection sensor for detecting the distance to a subject, and the like. These sensors are required to obtain stable detection signals.

Meanwhile, with imaging apparatuses such as cameras, there are cases where it is not possible to properly obtain sensor signals for a certain period of time due to adjustment of an optical system. For example, there are cases where audio from a subject cannot be properly obtained due to sound generated during the diaphragm closing operation. As described above, if sensor signals are not properly obtained, it leads to a decline in performance of the imaging apparatus and a decline in quality of captured information. In order to solve these problems, various signal processing circuits and imaging apparatuses have been proposed.

For example, Japanese Patent Laid-Open No. 03-295400 discloses an imaging apparatus that removes noise from audio signals by using a reference sensor and an adaptive filter. Also, Japanese Patent Laid-Open No. 2008-053802 discloses a method for processing audio signals in which an audio pitch near a brief noise is detected and a predictive signal is properly generated.

However, the conventional techniques described above are problematic in that a component is required for performing appropriate processing in the case where a situation occurs briefly in which only inappropriate signals are obtained, or the load is intensively transmitted at a specific timing. For example, the method disclosed in Japanese Patent Laid-Open No. 03-295400 requires a sensor for obtaining the reference signal of the adaptive filter. Also, the method disclosed in Japanese Patent Laid-Open No. 2008-053802 requires detection of the pitch and generation of the predictive signal at the occurrence of a noise, resulting in concentration of a computational load.

SUMMARY OF THE INVENTION

The present invention realizes processing that, even if a situation occurs briefly in which only inappropriate signals are obtained from a sensor, minimizes the negative effects while dispersing the processing load.

According to one aspect of the present invention, there is provided an audio processing apparatus comprising: an obtaining unit configured to obtain audio signals; and a processor configured to process the audio signals, wherein if it is not determined that the audio signals contain an abnormal value, the processor calculates a next sample value based on a predetermined number of sample values of the audio signals obtained by the obtaining unit, and wherein if it is determined that the audio signals contain an abnormal value, the processor uses the calculated next sample value to calculate a further next sample value.

Further features of the present invention will become apparent from the following description of exemplary embodiments (with reference to the attached drawings).

DESCRIPTION OF THE EMBODIMENTS

Embodiment 1

Hereinafter, an imaging apparatus according to a first embodiment of the present invention will be described with reference to FIGS. 1 to 7. In the first embodiment, an example will be described in which audio signals are used as the target to be processed, and a microphone is used as a specific sensor.

Figure 2:
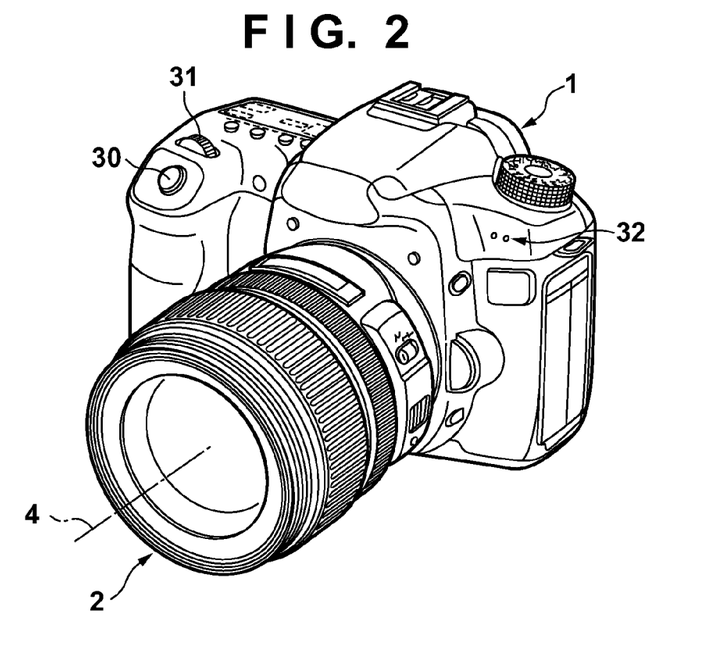
FIG. 2 is a perspective view showing an external configuration of an imaging apparatus according to Embodiment 1.
Figure 3:
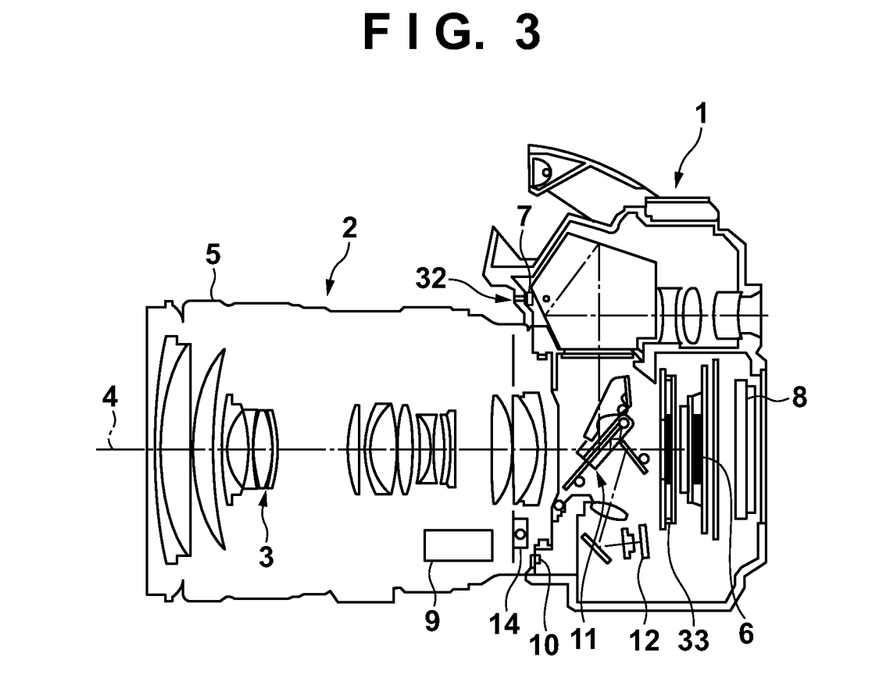
FIG. 3 is a cross sectional view of the imaging apparatus according to Embodiment 1.

FIG. 2 is a perspective view showing an external configuration of an imaging apparatus. FIG. 3 is a cross sectional view of the imaging apparatus. Reference numeral 1 indicates an imaging apparatus, and 2 indicates a lens that has been attached to the imaging apparatus 1. The imaging apparatus 1 includes a release button 30 and an operation button 31. The lens 2 includes a lens barrel 5, an imaging optical system 3 housed in the lens barrel 5, and an optical system driver 9 that drives the imaging optical system 3. Reference numeral 4 indicates the optical axis of the lens. Reference numeral 6 indicates an image sensor that serves as a photoelectric conversion unit and is provided near an image formation plane of the imaging optical system 3. Reference numeral 8 is a display device provided on the back of the imaging apparatus 1. Reference numeral 10 is a contact point connecting the imaging apparatus 1 and the lens 2. Reference numeral 11 is a quick return mirror mechanism, and 12 is a focus detector including an AF sensor. Reference numeral 14 is a vibration sensor, and 33 is a focal plane shutter.

The imaging apparatus 1 is provided with a microphone 7, and thus can obtain and store audio at the same time when an image is obtained. An opening 32 is provided in the front of the microphone 7. In the present embodiment, a plurality of (for example, two) microphones 7 are mounted, and accordingly, as shown in FIG. 2, openings 32 are provided for each respective microphones.

Figure 4:
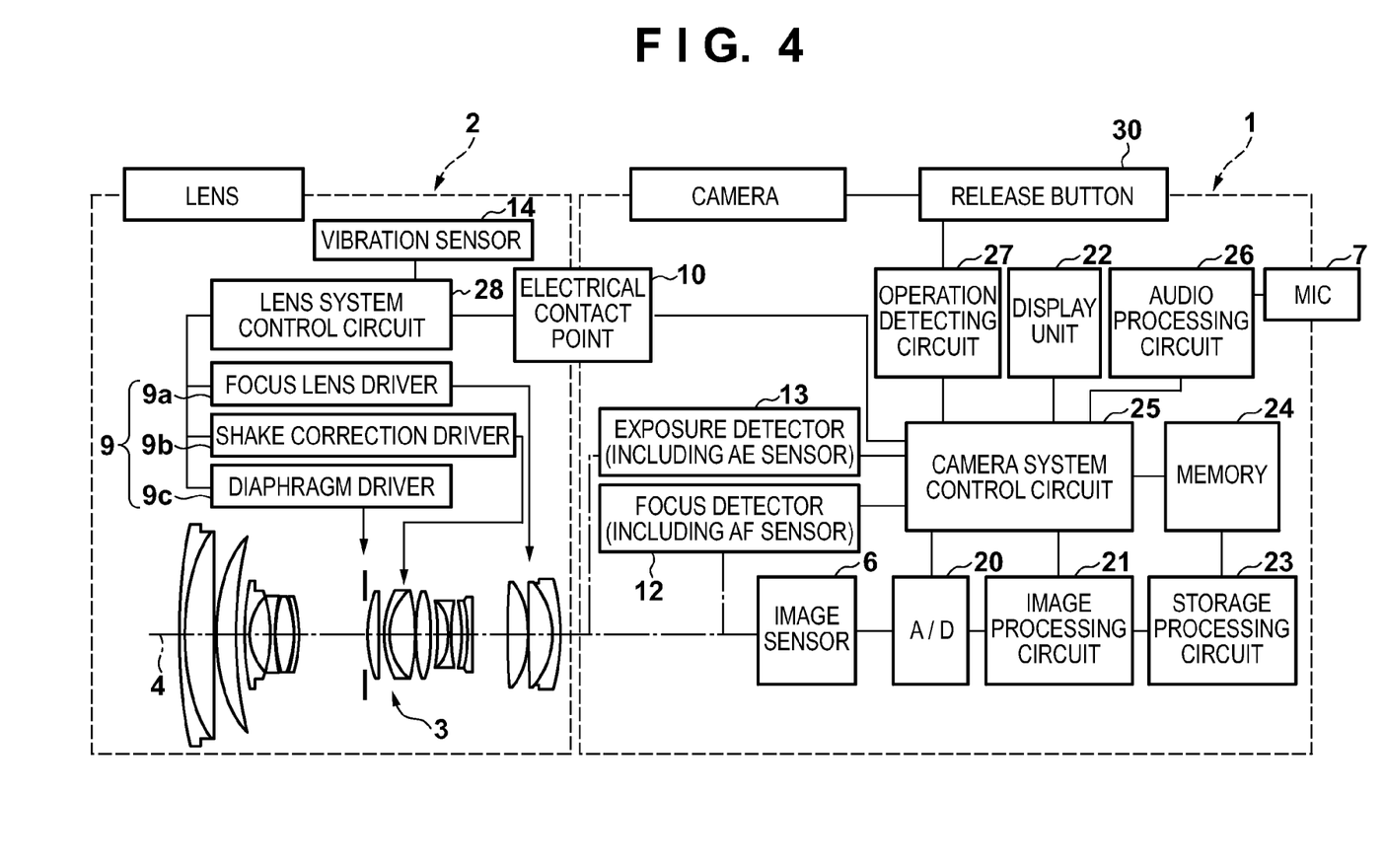
FIG. 4 is a block diagram of the imaging apparatus according to Embodiment 1.

FIG. 4 is a block diagram showing an electrical configuration of the imaging apparatus 1 and the lens 2. The imaging apparatus 1 (camera) includes an imaging system, an image processing system, an audio processing system, a storage/reproduction system and a control system. The imaging system includes the imaging optical system 3 provided in the lens 2 and the image sensor 6 provided in the imaging apparatus 1. The image processing system includes an A/D converter 20 and an image processing circuit 21. The audio processing system includes the microphone 7 and an audio processing circuit 26. The storage/reproduction system includes a storage processing circuit 23 and a memory 24. The control system includes a camera system control circuit 25, the focus detector 12 (including an AF sensor), an exposure detector 13 (including an AE sensor), the vibration sensor 14, an operation detecting circuit 27, a lens system control circuit 28, the release button 30 and the optical system driver 9. The optical system driver 9 includes a focus lens driver 9a, a shake correction driver 9b and a diaphragm driver 9c.

The imaging system constitutes an optical processing system in which light from an object is focused via the imaging optical system 3 so as to form an image on an imaging plane of the image sensor 6. During preparatory operations for imaging such as aiming, a part of the beam is guided to the focus detector 12 as well, via a mirror provided in the quick return mirror mechanism 11. As will be described later, by the control system adjusting the imaging optical system as appropriate, the image sensor 6 is exposed to an appropriate amount of object light and a subject image is formed in the vicinity of the image sensor 6.

The image processing circuit 21 is a signal processing circuit that processes image signals corresponding to the number of pixels of the image sensor that have been received from the image sensor 6 via the A/D converter 20, and includes a white balance circuit, a gamma correction circuit, an interpolation arithmetic circuit that performs resolution enhancement by interpolation operation, and so on.

The audio processing system generates an audio signal to be recorded by performing appropriate processing on a signal from the microphone 7 with the use of the audio processing circuit 26. The generated signal to be recorded is compressed by a storage processor, which will be described later, in association with the image during moving image shooting.

The storage processing circuit 23 outputs an image signal to the memory 24 and at the same time generates and stores an image that is to be output to a display unit 22. Also, the storage processing circuit 23 compresses images, moving images and audio by using a predetermined method.

The camera system control circuit 25 generates and outputs a timing signal and the like during image shooting. The focus detector 12 detects the focusing state of the imaging apparatus. The subject brightness is detected by the exposure detector 13 during still image shooting and is detected by processing of a signal from the image sensor 6 during moving image shooting. The lens system control circuit 28 adjusts the optical system by moving the lens as appropriate according to a signal from the camera system control circuit 25.

The control system controls the imaging system, the image processing system and the storage/reproduction system according to external operations. For example, during still image shooting, in response to the operation detecting circuit 27 detecting that the release button 30 has been pressed down, the camera system control circuit 25 performs control for driving of the image sensor 6, operation of the image processing circuit 21, compression processing of the storage processing circuit 23, and the like. Also, the camera system control circuit 25 controls the state of each segment of an information display device that displays information on an optical viewfinder, the display device 8 and the like via the display unit 22.

Next, the operation for adjusting the optical system performed by the control system will be described. The camera system control circuit 25 is connected to the focus detector 12 and the exposure detector 13. During still image shooting, the camera system control circuit 25 determines an appropriate focusing position and diaphragm position based on signals from these detectors. The camera system control circuit 25 sends an instruction to the lens system control circuit 28 via the electrical contact point 10, and the lens system control circuit 28 controls the focus lens driver 9a and the diaphragm driver 9c as appropriate. During moving image shooting, on the other hand, the focus lens is slightly moved by the focus lens driver 9a, the signal from the image sensor 6 is analyzed, and the focusing position is determined from a contrast of the signal. Furthermore, the diaphragm position is determined from the level of the signal from the image sensor 6.

Also, the lens system control circuit 28 is connected to the vibration sensor 14. In a mode in which hand shake correction is performed during still image shooting, the shake correction driver 9b is controlled as appropriate based on the signal from the vibration sensor 14. In a mode in which hand shake correction is performed during moving image shooting, the shake correction driver 9b can be driven as in the case of still image shooting. Alternatively, it is also possible to perform electronic image stabilization in which the positions read out by the image sensor 6 are changed based on the signals from the vibration sensor 14.

Next, the operation for shooting a still image will be described. The imaging apparatus 1 performs focus/exposure detection by using the lens 2, the focus detector 12 and the exposure detector 13, and at the same time drives a part of the imaging optical system 3 so as to adjust the imaging optical system 3, thereby forming an image in the vicinity of the image sensor 6. The imaging apparatus 1 also operates a diaphragm so as to provide appropriate exposure. Furthermore, various shooting conditions are set by the user operating the operation button 31 and the like (user operation), and the quick return mirror mechanism 11 and the focal plane shutter 33 are operated in synchronization with the operation of the release button 30. After appropriate exposure control has been performed, subject information is obtained from the image sensor 6 and stored in the memory 24.

Next, the operation for shooting a moving image will be described. Prior to shooting a moving image, upon pressing an unshown live view button ("live view" refers to displaying images obtained by the image sensor 6 on the display device 8 in real time), the images obtained by the image sensor 6 are displayed on the display device 8. The imaging apparatus 1 obtains subject information from the image sensor 6 at a set frame rate in synchronization with the operation of a moving image shooting button, and at the same time obtains audio information from the microphone 7, and thereafter stores these pieces of information in a memory in synchronization with each other. In the case where adjustment of the optical system is required during moving image shooting, the optical system is adjusted as appropriate by using the optical system driver 9. The image shooting ends in synchronization with the operation of the moving image shooting button.

The imaging apparatus 1 can perform still image shooting anytime, even during moving image shooting, by operation of the release button 30.

Here, image shooting in conjunction with audio storage such as moving image shooting will be discussed. In image shooting in conjunction with audio storage, sounds generated while the camera itself and the lens actuator are being driven (hereinafter referred to as "mechanical sound") are unwanted sounds, or in other words, noise. The term "noise" used in the present embodiment refers to mechanical sounds, and not background noise such as white noise.

Figure 5:
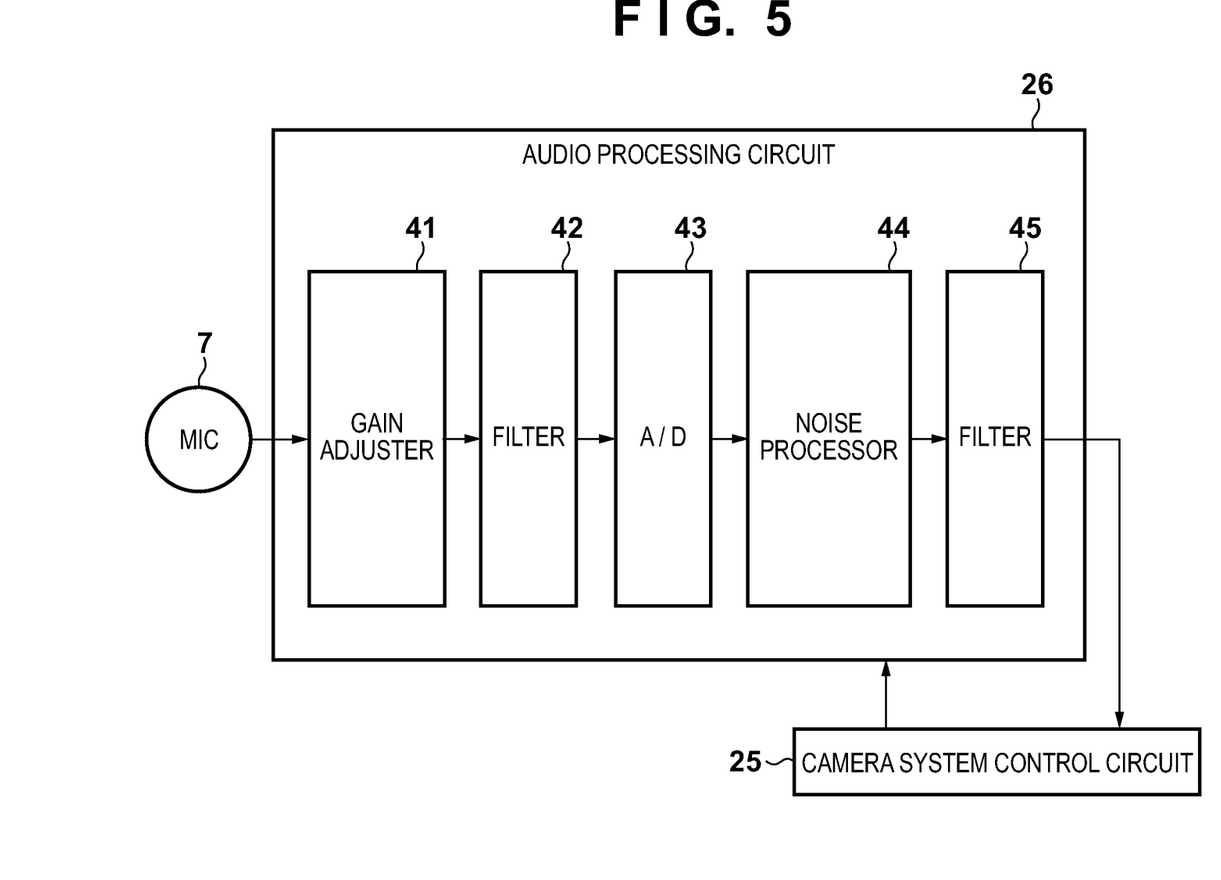
FIG. 5 is a block diagram of an audio processing circuit according to Embodiment 1.

The configuration of the audio processing circuit 26 will be described in detail with reference to FIG. 5. As shown in FIG. 5, the audio processing circuit 26 includes a gain adjuster 41, a filter 42, an A/D converter 43, a noise processor 44 and a filter 45. The signal obtained from the microphone 7 is supplied to the gain adjuster 41. The gain adjuster 41 adjusts the level of the signal from the microphone 7 such that the dynamic range of the A/D converter 43 is sufficiently utilized. Specifically, when the signal level of the microphone 7 is low, the signal is amplified by increasing the gain, and when the signal level of the microphone 7 is high, the gain is decreased to prevent saturation. The filter 42 is constituted by a low-pass filter having an appropriate cutoff frequency, or the like, in consideration of the sampling frequency of the A/D converter 43. In the case where the microphone is located in the vicinity of an element that emits a specific frequency, the filter 42 may further include an appropriate notch filter in addition to the low-pass filter. The A/D converter 43 converts the signal processed by the gain adjuster 41 and the filter 42 into a digital signal.

The noise processor 44 is configured so as to include an adaptation unit and a prediction unit (hereinafter the noise processor including the adaptation unit and the prediction unit will be referred to as "adaptive predictor"). A detailed description of the noise processor 44 will be given later. The noise processor may also include other circuits for processing noise such as a filter, but such circuits are not essential to the present invention, and thus a description thereof is not given here. The filter 45 is a post filter, and performs appropriate filter processing where necessary.

Figure 1:
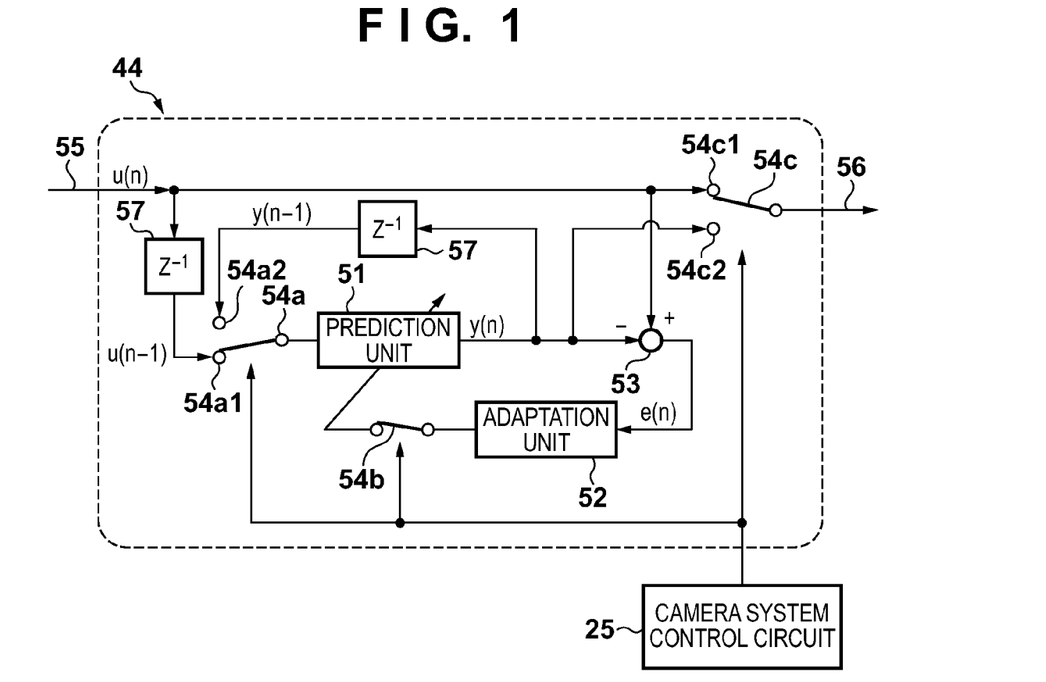
FIG. 1 is a block diagram showing a signal processor according to Embodiment 1.

Next, the noise processor 44 constituted by the adaptive predictor will be described with reference to FIG. 1. In FIG. 1, the prediction unit is indicated by 51 and the adaptation unit is indicated by 52. Reference numeral 53 indicates a subtracter. Reference numeral 54a indicates a prediction unit input switching switch, and 54a1 and 54a2 indicate contact points of the prediction unit input switching switch 54a. Reference numeral 54b indicates an adaptive operation switch. Reference numeral 54c indicates an output switching switch, and 54c1 and 54c2 indicate contact points of the output switching switch 54c. Reference numeral 55 indicates an input terminal to the noise processor 44, 56 indicates an output terminal from the noise processor 44, and 57 indicates a unit delay device. Also, reference signs u(n), y(n) and e(n) respectively indicate the observed value, the predicted value and the predicted error of a sensor (microphone in the present embodiment) in the nth sample.

First, a case will be described in which a signal from the sensor is properly obtained. In this case, under control of the camera system control circuit 25, the prediction unit input switching switch 54a is switched toward the contact point 54a1, the adaptive operation switch 54b is turned on, and the output switching switch 54c is switched toward the contact point 54c1.

As a result, an observed value u(n−1) that has been unit-delayed by the unit delay device 57 is input into the prediction unit 51 via the prediction unit input switching switch 54a. The prediction unit 51 outputs the current predicted value y(n) based on the input past observed values. Specifically, the prediction unit 51 generates the current predicted value y(n) based on the past observed values up to the previous sample's value u(n−1) in the previous samples. In this specification, the operation for obtaining the current predicted value from the observed values that have been observed up to the previous sample is referred to as the "prediction operation". The subtracter 53 calculates the difference between the observed value u(n) and the predicted value y(n), namely, e(n)=u(n)−y(n) (or in other words, predicted error). The adaptation unit 52 updates the prediction unit 51 with an appropriate adaptive algorithm by using the predicted error. Since the output switching switch 54c is in contact with the contact point 54c1, the current observed value u(n) that has been input into the input terminal 55 is selected as an output signal, and is output to the output terminal 56 via the output switching switch 54c.

As described above, in the case where the signal from the sensor is properly obtained, the signal from the input terminal 55 is output to the output terminal 56, and the adaptive operation of the prediction unit 51 is performed by the adaptation unit 52. In this specification, the operation for updating the prediction unit 51 performed by the adaptation unit 52 is referred to as the "adaptive operation". Detailed descriptions of the operations of the prediction unit 51 and the adaptation unit 52 will be given later.

Next, a case will be described in which the signal from the sensor is not properly obtained. In this case, under control of the camera system control circuit 25, the prediction unit input switching switch 54a is switched toward the contact point 54a2, the adaptive operation switch 54b is turned off, and the output switching switch 54c is switched to the contact point 54c2.

Accordingly, a past predicted value y(n−1) is feedback-input into the prediction unit 51 via the prediction unit input switching switch 54a. The prediction unit 51 outputs a predicted value y(n) based on the past predicted value that has been feedback-input. Since the adaptive operation switch 54b is off, the operations of the adaptation unit 52 and the subtracter 53 are stopped. Also, since the output switching switch 54c is in contact with the contact point 54c2, the predicted value y(n) is selected as an output signal, and output to the output terminal 56.

As described above, in the case where the signal from the sensor is not properly obtained, the predicted value generated by the prediction unit 51 is output to the output terminal 56, during which the operation of the adaptation unit 52 is stopped.

In the present invention, the camera system control circuit 25 needs to determine whether or not the signal from the sensor is properly obtained, or in other words, whether or not the observed value obtained by the sensor contains an abnormal value. In this respect, the cause for the observed value obtained by the sensor containing an abnormal value is relevant to the operation of the imaging apparatus (for example, driving of the imaging optical system), and therefore the camera system control circuit 25 can determine that the observed value contains an abnormal value at the timing at which the operation of the imaging apparatus is performed.

Figure 6A:
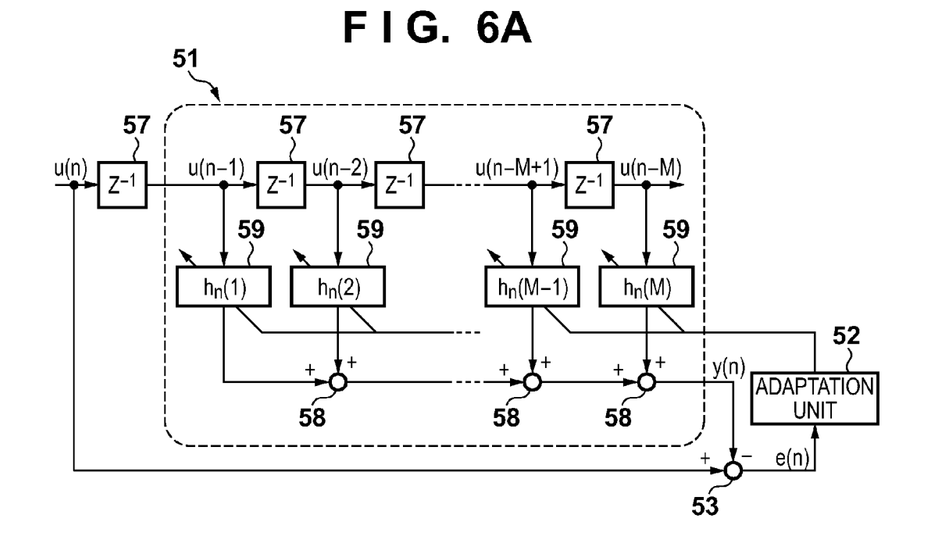
FIGS. 6A to 6B show diagrams illustrating operations of a prediction unit and an adaptation unit according to Embodiment 1.
Figure 6B:
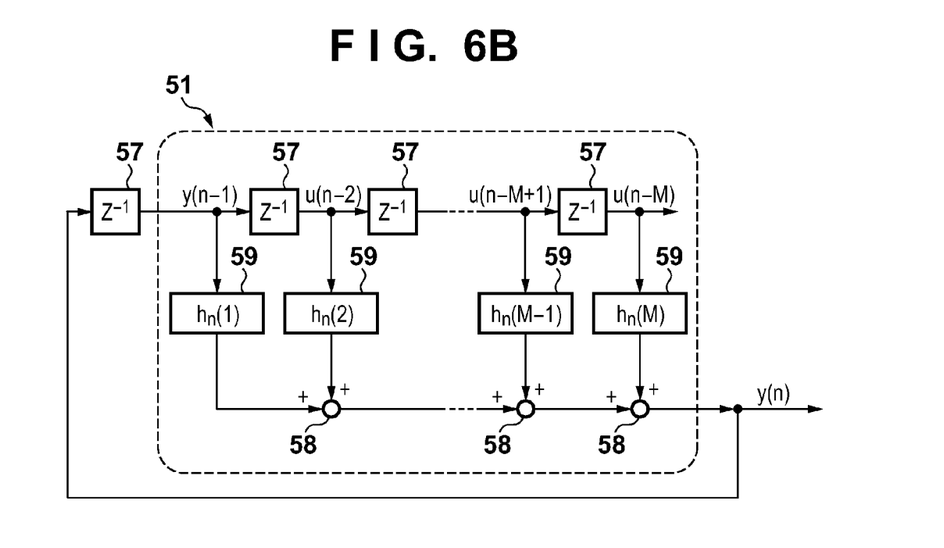

Next, the operations of the prediction unit 51 and the adaptation unit 52 will be described with reference to FIGS. 6A to 6B. FIG. 6A shows the prediction unit 51 and the adaptation unit 52 during the adaptive operation, and FIG. 6B shows the prediction unit 51 performing the prediction operation in the case where an appropriate observed value is not obtained for a single sample. FIGS. 6A to 6B show only operations of the prediction unit 51 and the surrounding units, and therefore the switches and the like shown in FIG. 1 are not illustrated.

In FIGS. 6A to 6B, reference numeral 58 indicates an adder, and reference numeral 59 indicates a filter coefficient. As shown in FIGS. 6A to 6B, the prediction unit 51 of the present embodiment is constituted by a transversal filter. It is also possible to use a filter of other types that can use an appropriate adaptive algorithm such as a lattice filter, but an example using a transversal filter will be described here.

First, the adaptive operation will be described. In the case where the adaptive operation is performed as in FIG. 6A, as can be clearly seen from the diagram, the current predicted value y(n) is obtained by the following equation.

$$y(n) = \sum_{i=1}^{M} h_n(i)u(n-i) \quad (1)$$

where M is the filter order and is set to an appropriate value according to the sampling frequency of the signal that is subjected to the prediction operation or the adaptive operation, the time during which the prediction operation is performed, and the like.

Various algorithms for adaptive operation (adaptive algorithms) have been proposed. Here, an LMS algorithm will be described. This algorithm is derived from a gradient method, and updates a filter coefficient $h_n$ by using the following equation. In the equation, the subscript n indicates the filter coefficient in the nth sample.

$$h_{n+1}(i) = h_n(i) + \mu e(n)u(i) \ (i=1,2,\ldots,M) \quad (2)$$

where μ is a positive coefficient called a "step size parameter". With the LMS algorithm, the filter coefficient $h_n$ is approximated from the initial value to the value at which the predicted error is minimized by using the steepest decent method. If the predicted error e(n) is sufficiently small (it means that the predicted value y(n) is a good approximation to the observed value u(n)), the amount updated by the adaptive operation is reduced.

Next, the prediction operation will be described. As shown in FIG. 6B, in the case of performing the prediction operation, the predicted value y(n) is used instead of the observed value u(n). In the example shown in FIG. 6B, y(n−1) is used instead of u(n−1). However, the samples before that used the observed value, and thus FIG. 6B shows the case where the observed value is not properly obtained for only a single sample.

If the predicted error e(n) is sufficiently small as a result of the adaptive operation described above, u(n−1)≈y(n−1) is satisfied, and it is therefore expected that the predicted value y(n) re-determined by substituting with one sample's worth of prediction will also become a good approximation. In the next incidence of prediction, y(n) is used instead of u(n). By sequentially repeating this, it is also possible to make a prediction not only for a single sample, but also for a longer period.

Here, computational complexity will be discussed. As can be clearly seen from the equation (1), calculation of a predicted value requires only a sum-of-products corresponding to the number of taps. Also, as can be clearly seen from the equation (2), performing the adaptive operation requires only two times multiplication of the number of taps and addition corresponding to the number of taps. Accordingly, it can be said that the computational complexity for a unit time (each sample) is very low. A method is also conceivable in which the filter coefficient $h_n$ is determined before performing the prediction operation, but with the method of the present invention, the computational complexity processed for a unit time is lower than such a method, and therefore it can be said that the method of the present invention is suitable for real-time processing.

Since the adaptive operation can be performed in real time, adaptation proceeds while the observed value is properly obtained, and thus the predicted value y(n) always becomes a good approximation to u(n). In the case where the observed value is not properly obtained, the output switching switch 54c shown in FIG. 1 can be instantly switched.

Figure 7:
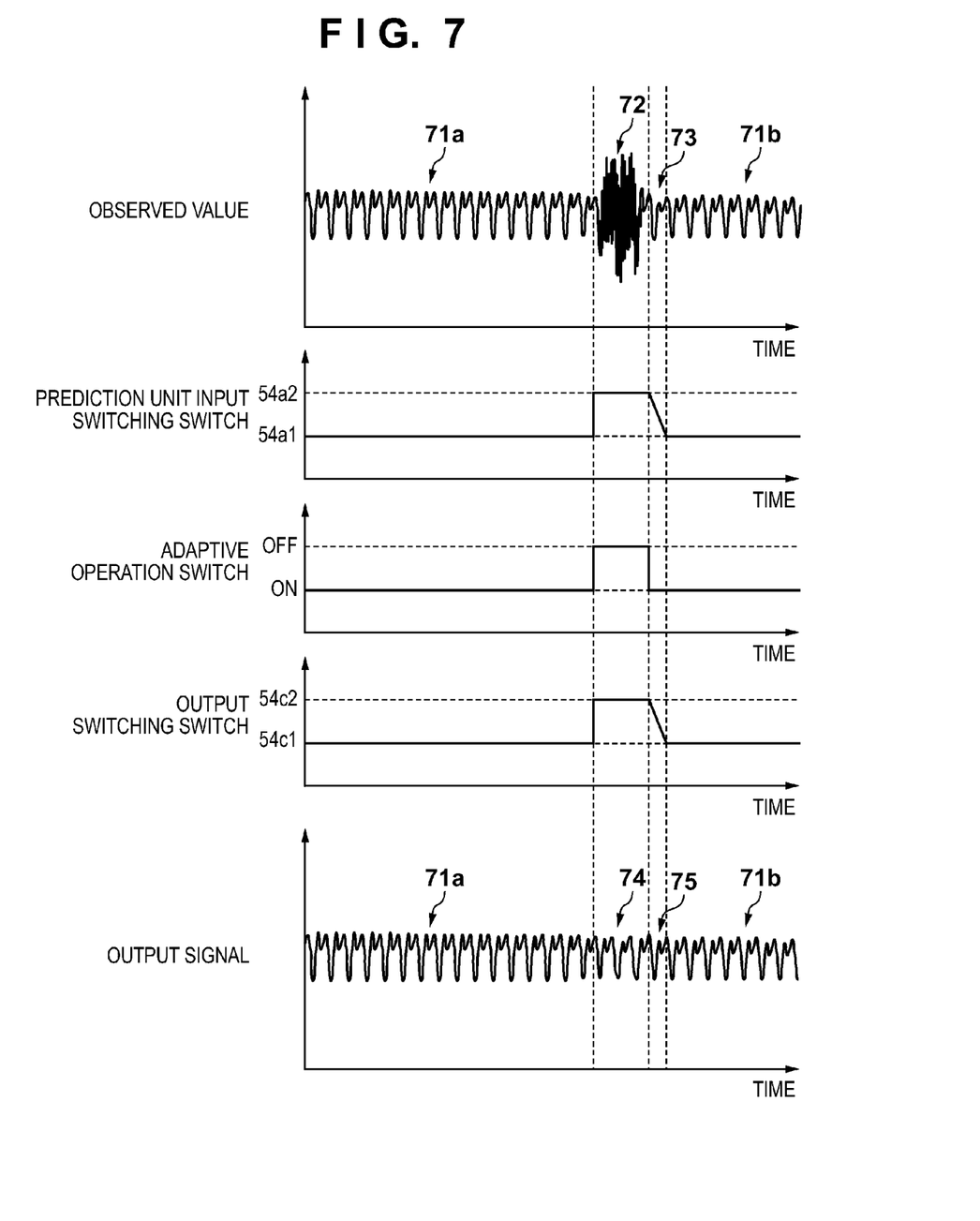
FIG. 7 is a diagram illustrating audio signal processing according to Embodiment 1.

An example of audio signal processing according to the present embodiment will be described with reference to FIG. 7. FIG. 7 shows, from the top, the observed value, a switching sequence of the prediction unit input switching switch 54a, a sequence of the adaptive operation switch 54b, a switching sequence of the output switching switch 54c, and the output signal. As used herein, the observed value is an input to the noise processor 44 shown in FIG. 5, and the output signal is an output to the noise processor 44.

In FIG. 7, reference numerals 71a and 71b indicate appropriate observed values. Reference numeral 72 indicates observed values that are not appropriate (or in other words, abnormal values). Reference numeral 73 indicates observed values in a transition region. Reference numeral 74 indicates predicted values, and reference numeral 75 indicates an output in the transition region. The transition region will be described later.

FIG. 7 shows a situation in which the imaging apparatus itself has performed some kind of adjustment operation during storing audio. The adjustment operation can be, for example, adjustment of light amount or the like. The light amount adjustment is performed by operating the diaphragm driver 9c when, for example, the signal level of the image sensor 6 becomes high during moving image shooting. The adjustment operation is also performed in order to control the depth-of-field when the user has given an instruction to move the diaphragm to a desired position. At this time, as a result of the diaphragm driver 9c starting its operation, a loud noise is generated although only for a short period of time. As a result, it becomes difficult for the microphone 7 to appropriately obtain audio signals from the subject, causing a situation in which the observed value is not properly obtained. In FIG. 7, the diaphragm driver 9c is in operation for the period of time indicated by reference numeral 72.

The operation of each unit shown in FIG. 7 will be described in time series. The adaptive operation is performed during the time in which appropriate observed values 71a are obtained. The switches are switched to the same state as that of FIG. 1 by the camera system control circuit 25, and the filter coefficient $h_n$ in the prediction unit 51 is adaptively updated by the adaptation unit 52. Also, the observed values 71a are output as output signals.

When inappropriate observed values 72 are obtained due to the occurrence of a noise, the adaptive operation is stopped, and the prediction operation is repeatedly performed. As described above, at the time of the occurrence of a noise, due to the adaptive operation, the predicted value is a good approximation to the observed value. At this time, the output from the prediction unit 51 is output as an output signal 74.

When generation of the noise ends, appropriate observed values 73 are again obtained. In this specification, a region corresponding to a predetermined period of time during which appropriate observed values are obtained after occurrence of a noise is referred to as the "transition region". The transition region is a region provided for the purpose of smooth transition from the predicted value to the observed value. In the transition region, the predicted value and the observed value are appropriately overlap-added. In the transition region shown in FIG. 7, the smooth transition in the sequences of the prediction unit input switching switch 54a and the output switching switch 54c indicates that overlap-addition has been performed. The length of the transition region may be set to approximately 10 ms. Audio signals easily sense impulsive noise when the differential value (=variation) is large. Accordingly, it is convenient to provide the transition region for gradual transition to the observed value. Therefore, in the transition region, appropriate mixing is performed such that the output from the prediction unit 51 gradually gets close to the observed value 73, whereby an output signal 75 is generated.

During the time in which appropriate observed values 71*b* are obtained after the transition region, the adaptive operation is again performed, and the filter coefficient $h_n$ in the prediction unit 51 is adaptively updated by the adaptation unit 52. The observed values 71*b* are output as output signals.

According to the present embodiment, it is possible to provide an imaging apparatus capable of appropriately performing prediction processing on audio signals even if a situation occurs for a short period of time in which only inappropriate signals are obtained, while dispersing the prediction processing load.

Embodiment 2

An imaging apparatus according to a second embodiment of the present invention will be described below with reference to FIGS. 8 and 9. In the second embodiment, an example will be described in which shake correction signals are used as the target to be processed, and a gyro-sensor (=angular rate sensor) is used as the sensor.

The imaging apparatus of the present embodiment has the same external, mechanical and electrical configurations as those of the imaging apparatus of Embodiment 1, and therefore descriptions thereof are not given here.

The shake correction driver 9*b*, which is a subject matter of the present embodiment, will be described with reference to FIG. 8. FIG. 8 is a block diagram showing the electrical configuration of the shake correction driver 9*b* and the lens system control circuit 28. The shake correction driver 9*b* includes a driver 115, a lens driving apparatus 116 and a position sensor 117. The lens system control circuit 28 includes an LPF 101 (low-pass filter), an A/D converter 102, an integrator 103 and an HPF 104 (high-pass filter). The lens system control circuit 28 further includes an adaptive predictor 105, a determination condition storing unit 106, a shake signal processor 107, a target position processor 108, a lens information storing unit 109, a conversion coefficient calculation unit 110, a tracking control unit 111 and a driver information storing unit 112. The lens system control circuit 28 further includes a filter 113, a D/A converter 114 and an A/D converter 118.

As described in Embodiment 1, the camera system control circuit 25 and the lens system control circuit 28 are capable of exchanging information by performing communication with each other as appropriate.

Hand shake correction control will be described with reference to FIG. 8. When the user performs image shooting while holding the imaging apparatus 1, a so-called hand shake can occur. Such a shake is detected by the vibration sensor 14. In the present embodiment, a gyro-sensor is used as the vibration sensor, and thus the angular rate by hand shaking can be detected.

The vibration sensor 14 transmits the angular rate signal to the lens system control circuit 28. The angular rate signal first passes through the LPF. This is for removal of high frequency noise and prevention of aliasing at the A/D converter 102. In the A/D converter 102, analog to digital conversion is performed, and thus the signal is converted to digital data. The integrator 103 performs integration on the signal and converts the angular rate to obtain an angle. The HPF 104 blocks signals having a frequency sufficiently lower than that of hand shaking. This reduces the influence of drift of the gyro-sensor.

The adaptive predictor 105 has the same configuration as that of Embodiment 1. Specifically, the output of the HPF 104 shown in FIG. 8 is connected to the input terminal 55 shown in FIG. 1, and the output terminal 56 is connected to the input of the shake signal processor 107 shown in FIG. 8. The operation performed by the adaptive predictor will be described later.

The shake signal processor 107 reads out a tripod determination condition or a panning determination condition from the determination condition storing unit 106, and determines whether or not shake correction is necessary. In other words, in the case where hand shake correction is unnecessary when the imaging apparatus is attached to a tripod, the shake correction can be stopped. In the case of panning, by properly controlling the shake correction, the panning can be supported and the composition can be properly changed. The shake signal processor 107 makes a determination based on the angle information obtained up to here and the information obtained from the determination condition storing unit 106.

Generally, in a zoom lens, the relationship between the amount of movement of the shake correction lens and the variation in the angle of view (hereinafter referred to as "sensitivity") varies depending on the position of the zoom or the focus lens (hereinafter referred to as "lens information"). For this reason, the current lens information is obtained from the lens information storing unit 109. The conversion coefficient calculation unit 110 determines sensitivity based on the lens information, a lookup table and the like. The target position processor 108 converts the output from the shake signal processor 107 to the amount of movement of the shake correction lens by using the sensitivity.

The tracking control unit 111 performs control based on the output from the target position processor 108 so as to move the shake correction lens to the position indicated by the output of the target position processor 108. In the apparatus shown in FIG. 8, so-called feedback control is performed. The tracking control unit 111 obtains the current lens position from the position sensor 117 via the A/D converter 118. The tracking control unit 111 also obtains the sensitivity of the position sensor 117, offset due to attachment and the like from the driver information storing unit 112. The tracking control unit 111 generates an appropriate driving signal by comparison between the output from the target position processor 108 and the current lens position and using the driver information. For example, in the case of so-called P control, voltage that is proportional to the difference between the output from the target position processor 108 and the current lens position is transmitted to the filter 113 as a driving signal. The generated driving signal is transmitted to the filter 113. The filter 113 is a so-called phase compensator, and performs appropriate filter processing so as to prevent the feedback control system from being unstable. After that, the driving signal is given to the driver 115 via the D/A converter 114. The driver 115 properly amplifies the driving signal and supplies the signal to the lens driving apparatus 116 so as to move the lens. The lens position is again obtained by the position sensor 117 and used in the next arithmetic operation by the tracking control unit 111.

Figure 8:
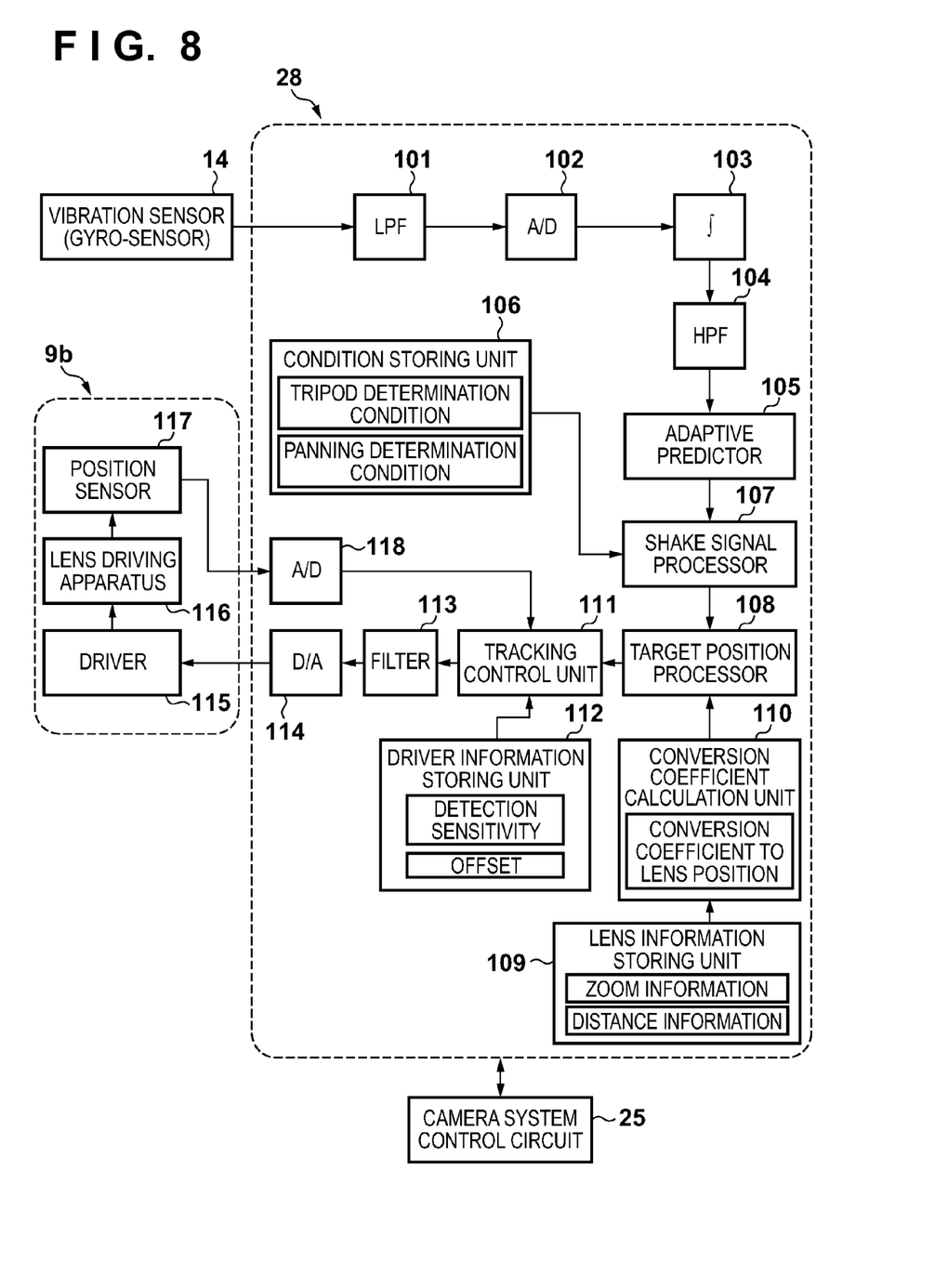
FIG. 8 is a block diagram showing a configuration of a shake correction driver and a lens system control circuit according to Embodiment 2.

In the example shown in FIG. 8, the adaptive predictor 105 is provided between the HPF 104 and the shake signal processor 107. This is a configuration in which the angle signal is predicted by the adaptive predictor 105. As another configuration, the adaptive predictor 105 can be provided in an appropriate location between the A/D converter 102 and the shake signal processor 107. For example, the adaptive predictor 105 can be provided between the A/D converter 102 and the integrator 103. This is a configuration in which the angular rate signal is predicted by the adaptive predictor 105.

Next, fluctuations in the signal of the vibration sensor 14 due to the operation of the focal plane shutter 33 will be described. The vibration sensor 14 is disposed such that high frequency vibrations are mechanically blocked by appropriate floating. However, there are cases where, in a situation such as when the focal plane shutter 33 is in operation, large high frequency vibrations occur, causing large fluctuations in the signal of the vibration sensor 14.

The signal fluctuations and the processing performed by the adaptive predictor 105 will be described with reference to FIG. 9. FIG. 9 shows, from the top, the signal (angular rate signal) of the vibration sensor 14, the signal (angle signal) that has undergone HPF processing by integration of the angular rate signal, and the signal (adaptive predictor output signal) obtained as a result of the angle signal being processed by the adaptive predictor 105. The signal after the A/D converter 102 of FIG. 8 corresponds to the angular rate signal of FIG. 9, and the signal after the HPF 104 of FIG. 8 corresponds to the angle signal of FIG. 9. Likewise, the signal after the adaptive predictor 105 of FIG. 8 corresponds to the adaptive predictor output signal of FIG. 9. The vertical axis of FIG. 9 indicates the signal level and the horizontal axis indicates the time. The time indicated by the horizontal axis of FIG. 9 is the same among three graphs, and thus broken lines vertically passing through FIG. 9 each indicate the same time among the three graphs. A region 121 and a region 123 shown in FIG. 9 are time periods in which the angular rate signal is properly obtained. A region 122 is a time period in which the signal of the vibration sensor 14 is fluctuated due to the operation of the focal plane shutter 33. The temporal duration of the region 122 can be approximately 50 ms.

Figure 9:
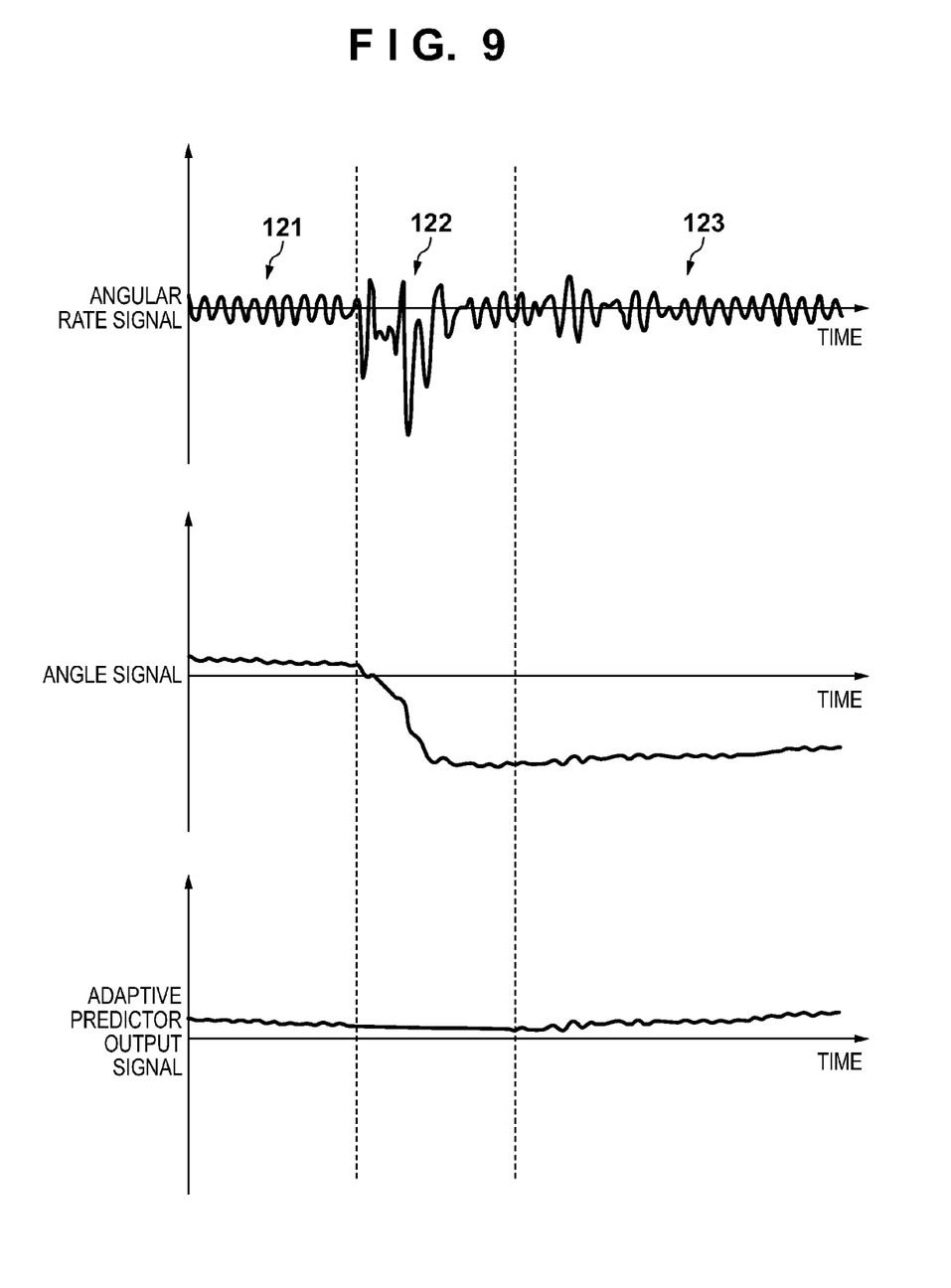
FIG. 9 is a diagram illustrating processing performed by an adaptive predictor according to Embodiment 2.

As shown in FIG. 9, in the angle signal obtained as a result of the signal in the region 122 being integrated, offsets have occurred in a portion corresponding to the region 122. The imaging apparatus 1 performs exposure time control by opening and closing of the focal plane shutter 33, and thus due to the opening operation of the focal plane shutter 33, the signal of the vibration sensor 14 cannot be correctly obtained during exposure. Taking as an example a situation in which image shooting is performed with an exposure time of approximately 1/10 seconds (100 ms), due to the offsets of the angle signal, the shake correction cannot be performed normally.

According to the present embodiment, such a problem can be solved by using the adaptive predictor 105. The adaptive predictor 105 performs the adaptive operation by using information prior to the region 121. As described in Embodiment 1, by providing a filter having an appropriate length and adaptation information, the adaptive predictor 105 can output a good approximation value. Upon receiving the operation timing of the focal plane shutter 33 from the camera system control circuit 25, the lens system control circuit 28 switches the operation of the adaptive predictor 105 to prediction operation at that timing (corresponding to the region 122), and when the operation of the focal plane shutter 33 is complete and a time has arrived in which it is expected that normal signals are obtained, the lens system control circuit 28 again switches the operation of the adaptive predictor 105 to adaptive operation. The switching operation for switching between adaptive operation and prediction operation in the adaptive predictor 105 is the same as that of Embodiment 1, and thus a description thereof is not given here. The adaptive predictor output signal shown in FIG. 9 is the result of the above-described operation.

By using the adaptive predictor output signal, it is possible to reduce the influence of fluctuations in the signal of the vibration sensor 14, and perform appropriate shake correction control.

According to the present embodiment, it is possible to provide an imaging apparatus capable of appropriately performing shake correction control even if a situation occurs for a short period of time in which only inappropriate signals are obtained, while dispersing the prediction processing load.

Embodiment 3

An imaging apparatus according to a third embodiment of the present invention will be described below with reference to FIG. 10. In the third embodiment, an example will be described in which focus detection signals are used as the target to be processed, and a focus detection sensor (AF sensor) is used as the sensor. The imaging apparatus of the present embodiment has the same external, mechanical and electrical configurations as those of the imaging apparatuses of Embodiments 1 and 2, and therefore descriptions thereof are not given here.

As described in Embodiment 1, the imaging apparatus 1 operates the focus lens driver 9a based on the signal from the focus detector 12 including an AF sensor, and forms an optical image in the vicinity of the image sensor 6.

Particularly when shooting a moving object (for example, a subject playing a sport), the image shooting is performed by predicting the position of the subject during exposure by continuously obtaining the signal of the focus detector 12 in time series (hereinafter referred to as "servo AF").

The need for prediction will be described below. As described in Embodiment 1, the imaging apparatus 1 performs image shooting by operating the quick return mirror mechanism 11 in synchronization with the operation of the release button 30. Meanwhile, as shown in FIG. 3, the focus detector 12 performs focus detection by using a beam deflected by the quick return mirror mechanism 11. Accordingly, focus detection cannot be performed when the quick return mirror mechanism 11 is operated at the shooting position. In this manner, a situation occurs in which the signal of the sensor (in this case, the AF sensor) cannot be obtained appropriately. In order to form a subject image on the image sensor 6 during exposure, it is necessary to predict the position of the subject during exposure.

Figure 10:
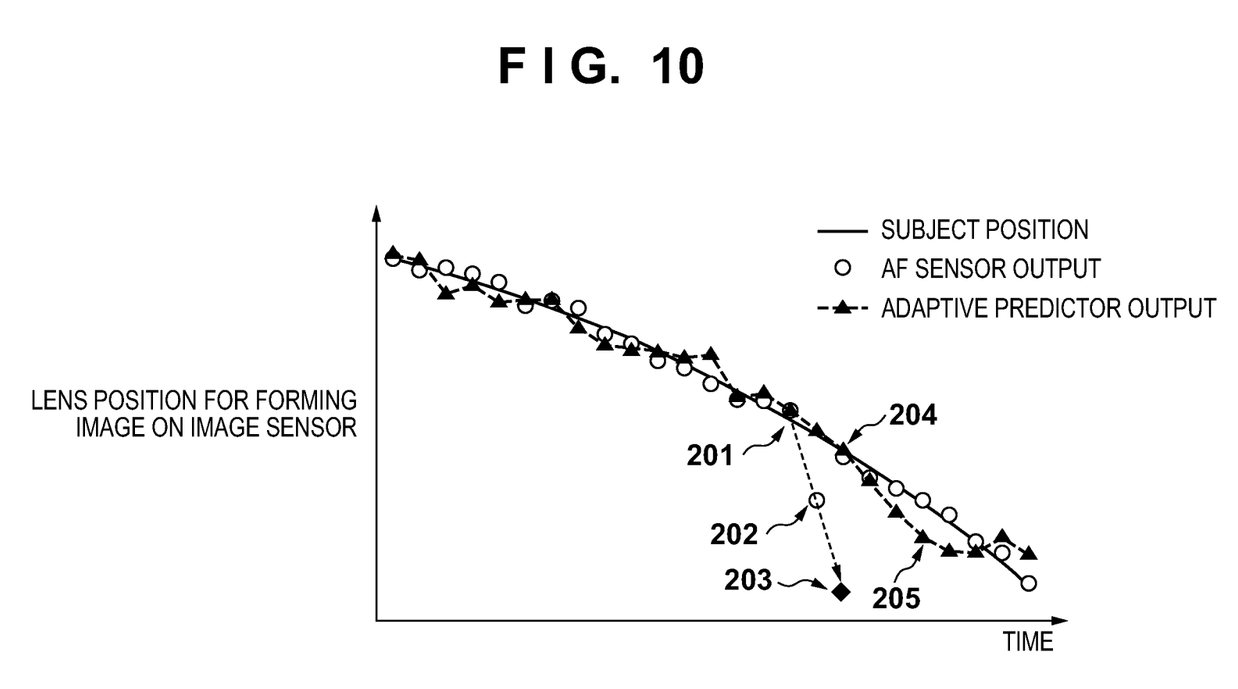
FIG. 10 is a diagram showing the position of the subject, AF sensor output and adaptive predictor output according to Embodiment 3.

FIG. 10 shows the signal obtained by the servo AF. The horizontal axis of FIG. 10 indicates time, and the vertical axis indicates the position of the focus lens (focus lens position) for forming an image on the image sensor 6. In FIG. 10, the subject position, the AF sensor output and the adaptive predictor output are also shown. The AF sensor output shown in FIG. 10 is a signal obtained from the AF sensor in time series during servo AF. In FIG. 10, reference numeral 202 indicates an observed value having a large error in detection of the AF sensor signal, and 201 indicates the observed value obtained in the sample previous to 202. Reference numeral 203 indicates a predicted value obtained as a result of linear functional prediction from 201 and 202, 204 indicates an adaptive predictor output at the same timing as 203, and 205 indicates an adaptive predictor output obtained in a sample subsequent to 202 by several samples.

In FIG. 10, since the focus lens position varies with time, a state is shown in which the subject is moving toward or away from the photographer. At this time, the AF sensor output can basically obtain the focus lens position. For example, in FIG. 10, the observed values obtained before 201 are, although there are errors with respect to the focus lens position, approximate values. If the error value in detection of the focus lens position is sufficiently small with respect to the depth-of-field, the error can be ignored in the practical use.

Processing of signals around the observed value 202 that is inappropriate shown in FIG. 10 will be described. The observed value 202 indicates a case in which, for example, the AF sensor signal has been saturated for some reason. At this time, an observed value having a non-negligible error with respect to the focus lens position is obtained. A practical example is when the subject is a train and the light from its headlight is incident on the AF sensor.

A case will be discussed in which an image shooting operation has started by the user operating the release button 30 at the timing indicated by 202. For example, in the case of an algorithm that predicts the position of the subject at the next timing based on two neighboring observed values (the observed values 201 and 202), calculation is performed by assuming that there is a predicted value 203 on a line connecting the observed value 201 and the observed value 202. The position of the predicted value 203 shown in FIG. 10 is determined as the position of the subject during exposure. As a result, the subject image is not formed on the image sensor 6, and instead a so-called out-of-focus image is obtained.

In the above example, the slope of the line connecting the observed values 201 and 202 is steeper than before, and thus it is determined that the subject has suddenly started moving at an accelerated pace. Although a method is conceivable in which a high level of determination is made by considering the above, it is not generally easy to implement such a method because it requires complex conditions for the determination.

In the present invention, the adaptive predictor is used to predict the position of the subject during servo AF described above. Specifically, the adaptive operation is performed using information obtained prior to the observed value 202 shown in FIG. 10, and the adaptive predictor output 204 is used instead of the predicted value 203.

More specifically, the AF sensor output is used as an input to the adaptive predictor, and is connected to the input terminal 55 shown in FIG. 1. The adaptive operation is performed prior to the image shooting operation by operation of the release button 30, and the prediction operation is performed in response to the operation of the release button 30. In FIG. 10, results are sequentially shown that were obtained by assuming that there was an operation of the release button 30 in each sample and performing prediction from information prior to the operation (for example, the adaptive predictor output 204 was calculated from information obtained prior to the observed value 202). By controlling the focus lens according to the adaptive predictor output 204, an appropriate subject image can be obtained.

As shown in FIG. 10, the adaptive predictor output can detect the focus lens position within a predetermined error range. The adaptive predictor output 205 shown in FIG. 10 has a certain error with respect to the focus lens position due to the influence of the observed value 202, but it can be seen that a significant improvement has been made with respect to the predicted value 203 described above.

According to the present embodiment, it is possible to provide an imaging apparatus capable of appropriately obtaining the focus lens position in the case where the servo AF is performed.

Various embodiments of the present invention have been described above, but it is to be understood that the present invention is not limited to these embodiments and various modifications and changes are possible within the scope of the invention.

In the embodiments, descriptions were given taking the imaging apparatus as an example, but any apparatus can be used as long as it can process an output from a specific sensor. For example, a commonly used information processing apparatus such as a computer can be used, and other possible examples include a cell phone, an industrial machine, an automobile, a game console and the like. In the case of an automobile, for example, the present invention is applicable for processing various outputs from sensors such as a gyro-sensor, a direction detection sensor and a temperature sensor. Likewise, in the case of a cell phone and a game console, the present invention is applicable for processing an output from an acceleration detection sensor that detects a rotation angle, a rotation direction and a direction of movement, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264110, filed Dec. 1, 2011, which is hereby incorporated by reference herein in its entirety.

What is claimed is:

1. An audio processing apparatus comprising:
    an obtaining unit configured to obtain an audio signal; and
    a processor configured to process the audio signal and to reduce noise in the audio signal,
    wherein if it is not determined that the audio signal contains an abnormal value, the processor obtains prediction data based on a predetermined number of samples of the audio signal obtained by the obtaining unit and updates parameter for obtaining the prediction data such that a difference between the prediction data and the audio signal obtained by the obtaining unit becomes smaller, and
    wherein if it is determined that the audio signal contains an abnormal value, the processor obtains next prediction data by using the prediction data which has already been obtained and reduces noise in the audio signal by using the next prediction data.

2. The audio processing apparatus according to claim 1, wherein if it is not determined that the audio signal contains an abnormal value, the processor stores the audio signals obtained by the obtaining unit in a storage medium.

3. The audio processing apparatus according to claim 1, wherein if it is determined that the audio signal contains an abnormal value, the processor stores the audio signals which the noise is reduced in a storage medium.

4. The audio processing apparatus according to claim 1, wherein the processor includes a filter configured to perform a filter process on the plurality of samples of the audio signal and to output the prediction data, and
if it is not determined that the audio signal contains an abnormal value, the processor updates a filter coefficient of the filter based on the difference between the prediction data and the audio signal obtained by the obtaining unit.

5. The audio processing apparatus according to claim 1, wherein the processor determines whether or not the audio signal contains an abnormal value based on an output from a vibration detection sensor.

6. The audio processing apparatus according to claim 1, wherein the processor outputs the next prediction data by using a transversal filter.

7. An audio processing apparatus comprising:
an obtaining unit configured to obtain audio signal; and
a processor configured to process the audio signal and to reduce noise in the audio signal,
wherein the processor has a first mode in which the processor obtains prediction data based on a predetermined number of samples of the audio signal obtained by the obtaining unit and updates parameter for obtaining the prediction data such that a difference between the prediction data and the audio signal obtained by the obtaining unit becomes smaller, and a second mode in which the processor obtains next prediction data by using the prediction data which has already been obtained and reduces noise in the audio signal by using the next prediction data.

8. An audio processing method comprising:
obtaining an audio signal;
obtaining, if it is not determined that the audio signal contains an abnormal value, prediction data based on a predetermined number of samples of the obtained audio signal and updating parameter for obtaining, the prediction data such that a difference between the prediction data and the obtained audio signal becomes smaller; and
obtaining, if it is determined that the obtained audio signal contains an abnormal value, next prediction data by using the prediction data which has already been obtained and reducing noise in the audio signal by using the next prediction data.

9. An audio processing method comprising:
obtaining an audio signal; and
in a first mode, obtaining prediction data based on a predetermined number of samples of the obtained audio signal and updating parameter for obtaining the prediction data such that a difference between the prediction data and the obtained audio signal becomes smaller; and
in a second mode, obtaining next prediction data by using the prediction data which has already been obtained and reducing noise in the obtained audio signal by using the calculated next sample value.

10. The audio processing apparatus according to claim 1, further comprising:
an imaging unit, and
wherein the processor determines whether or not the audio signal contains an abnormal value based on a diaphragm driving signal of the imaging unit.

11. The audio processing apparatus according to claim 1, wherein the processor stops updating the parameter if it is determined that the audio signal contains an abnormal value.

12. The audio processing apparatus according to claim 1, wherein the processor obtains the next prediction data by using the prediction data which has been obtained immediately before if it is determined that the audio signal contains an abnormal value.

13. The audio processing apparatus according to claim 4, wherein if it is not determined that the audio signal contains an abnormal value, the processor inputs the audio signal obtained by the obtaining unit into the filter, and
wherein if it is determined that the audio signal contains an abnormal value, the processor inputs the prediction data which has already been outputted from the filter into the filter instead of the audio signal obtained by the obtaining unit and reduces noise in the audio signal by using next prediction data obtained by the filter process on the predetermined number of samples including the inputted prediction data.

14. The audio processing apparatus according to claim 1, wherein the processor includes a prediction unit configured to output the prediction data,
wherein if it is not determined that the audio signal contains an abnormal value, the processor inputs the audio signal obtained by the obtaining unit into the prediction unit and updates parameter of the prediction unit such that a difference between the prediction data output from the prediction unit and the audio signal obtained by the obtaining unit becomes smaller, and
wherein if it is determined that the audio signal contains an abnormal value, the processor inputs the prediction data which has already been outputted from the prediction unit into the prediction unit instead of the audio signal obtained by the obtaining unit and reduces noise in the audio signal by using next prediction data obtained by the prediction unit using the predetermined number of samples including the inputted prediction data.

15. A signal processing apparatus comprising:
a sensor;
a processor configured to process an output audio signal from the sensor,
wherein if it is not determined that the output audio signal from the sensor contains an abnormal value, the processor obtains prediction data based on a predetermined number of samples of the output audio signal from the sensor and updates parameter for obtaining the prediction data such that a difference between the prediction data and the output audio signal from the sensor become smaller,
wherein if it is determined that the output audio signal from the sensor contains an abnormal value, the processor obtains next prediction data by using the prediction data which has already been obtained and outputs the next prediction data;
a controller configured to control a predetermined device,
wherein if it is not determined that the output audio signal from the sensor contains an abnormal value, the controller controls the predetermined device in accordance with the output audio signal from the sensor, and
wherein if it is determined that the output audio signal from the sensor contains an abnormal value, the controller controls the predetermined device in accordance with the next prediction data output from the processor.

* * * * *